(12) United States Patent
Liu et al.

(10) Patent No.: US 12,499,544 B2
(45) Date of Patent: Dec. 16, 2025

(54) METHOD FOR MAGNETIC RESONANCE IMAGE QUALITY ASSESSMENT AND MAGNETIC RESONANCE IMAGING SYSTEM

(71) Applicant: GE Precision Healthcare LLC, Wauwatosa, WI (US)

(72) Inventors: Xiaolan Liu, Beijing (CN); Yaan Ge, Beijing (CN); Qingyu Dai, Beijing (CN); Kun Wang, Beijing (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 425 days.

(21) Appl. No.: 18/086,159

(22) Filed: Dec. 21, 2022

(65) Prior Publication Data

US 2023/0206443 A1 Jun. 29, 2023

(30) Foreign Application Priority Data

Dec. 28, 2021 (CN) .......................... 202111628826.9

(51) Int. Cl.
| | |
|---|---|
| G06T 7/00 | (2017.01) |
| G01R 33/56 | (2006.01) |
| G06N 20/00 | (2019.01) |
| G06T 5/70 | (2024.01) |
| G06T 7/13 | (2017.01) |

(52) U.S. Cl.
CPC ............ *G06T 7/0014* (2013.01); *G01R 33/56* (2013.01); *G06T 2207/10088* (2013.01); *G06T 2207/20072* (2013.01); *G06T 2207/20081* (2013.01); *G06T 2207/30168* (2013.01)

(58) Field of Classification Search
CPC ..................... G06T 5/40; G06T 7/0012; G06T 2207/10088; G06T 2207/10072; G06T 2207/10116; G06T 2207/10081; G06T 2207/30004; G06T 7/0014; G06T 2207/20072; G06T 2207/20081; G06T 2207/30168; G06T 2207/20084; G06T 7/13; G01R 33/56; G01R 33/5608; G06N 20/00
USPC ................................................. 382/128, 382
See application file for complete search history.

(56) References Cited

U.S. PATENT DOCUMENTS 9,256,966 B2 * 2/2016 Jacobs ................. G06T 11/003
9,462,945 B1 * 10/2016 Barriga ................. A61B 3/152
9,646,376 B2 * 5/2017 Kaufman ............ G06F 3/04855
(Continued)

FOREIGN PATENT DOCUMENTS

CN 110399889 A * 11/2019 ............. G16H 30/20
CN 110717912 A 1/2020
(Continued)

OTHER PUBLICATIONS

CN110717912A English Abstract—Espacenet search results Dec. 21, 2022, 1 page.

*Primary Examiner* — Henok Shiferaw
*Assistant Examiner* — Dion J Satcher

(57) ABSTRACT

A method for magnetic resonance image quality assessment is provided. The method includes acquiring a magnetic resonance image; processing the magnetic resonance image to extract image parameters associated with a preset metric; and determining, on the basis of the image parameters, an image quality assessment result associated with the corresponding metric.

23 Claims, 15 Drawing Sheets

(56) References Cited

U.S. PATENT DOCUMENTS

| | | | |
|---|---|---|---|
| 10,247,802 B2 * | 4/2019 | Wang | G01R 33/5659 |
| 10,713,785 B2 * | 7/2020 | Braun | G06T 7/20 |
| 11,600,378 B2 * | 3/2023 | Satoh | A61B 5/055 |
| 2008/0159613 A1 * | 7/2008 | Luo | G06T 7/12 |
| | | | 382/132 |
| 2016/0247034 A1 * | 8/2016 | Lee | G06V 20/35 |
| 2019/0214149 A1 * | 7/2019 | Volkar | G16H 50/70 |
| 2019/0385279 A1 * | 12/2019 | Wang | G06T 11/005 |
| 2020/0051246 A1 * | 2/2020 | Carmi | A61B 5/055 |
| 2020/0279414 A1 * | 9/2020 | Andersson | G16H 50/70 |
| 2020/0363487 A1 * | 11/2020 | Rioux | A61B 5/055 |
| 2022/0270240 A1 * | 8/2022 | Jin | G06N 3/0464 |
| 2023/0293037 A1 * | 9/2023 | Schmithorst | A61B 5/055 |
| | | | 324/309 |

FOREIGN PATENT DOCUMENTS

| | | | | |
|---|---|---|---|---|
| WO | WO-2017019182 A1 * | 2/2017 | | G01R 33/5635 |
| WO | 20210641941 W | 4/2021 | | |

\* cited by examiner

METHOD FOR MAGNETIC RESONANCE IMAGE QUALITY ASSESSMENT AND MAGNETIC RESONANCE IMAGING SYSTEM

CROSS REFERENCE

The present application claims priority and benefit of Chinese Patent Application No. 202111628826.9 filed on Dec. 28, 2021, which in incorporated herein by reference in its entirety.

TECHNICAL FIELD

The present invention relates to the field of medical imaging and, in particular, to a method for magnetic resonance image quality assessment, a magnetic resonance imaging system and a computer readable storage medium.

BACKGROUND

In magnetic resonance imaging, the quality of the generated magnetic resonance image has a significant impact on the diagnosis and treatment of diseases. Physicians or technicians usually assess the quality of images with the naked eye and based on their experiences. With the development of deep learning technology, those skilled in the art have also proposed to assess the quality of magnetic resonance images based on deep learning technology, which is usually not accurate enough or too general to meet the needs of deeper or broader applications.

SUMMARY

One aspect of the present invention provides a method for magnetic resonance image quality assessment, the method comprising: acquiring a magnetic resonance image; processing the magnetic resonance image to extract image parameters associated with a preset metric; and determining, on the basis of the image parameters, an image quality assessment result associated with the corresponding metric.

On another aspect, the method further comprises: selecting and outputting an image quality assessment result of a corresponding magnetic resonance image based on information associated with the magnetic resonance image pre-stored in the database.

On another aspect, the associated information comprises one or more of time information about when a magnetic resonance image is generated, scan parameters used when the magnetic resonance scan is performed, human anatomy information used when performing the magnetic resonance scan, and/or information of a product that performs the magnetic resonance scan.

On another aspect, the method further comprises: generating state indication information for a magnetic resonance imaging system based on the image quality assessment result.

On another aspect, the method further comprises: selecting the preset metric and outputting an image quality assessment result associated with the selected metric.

On another aspect, the step of selecting the preset metric comprises: selecting one of at least two image quality analysis modes, wherein the at least two image quality analysis modes comprise different combinations of metrics.

On another aspect, the preset metric comprises one or more of a signal-to-noise ratio, a contrast-to-noise ratio, motion artifacts, shading, and/or a subjective score.

On another aspect, the step of processing the magnetic resonance image comprises: pre-processing the magnetic resonance image; respectively performing scaling processing on the pre-processed magnetic resonance image based on a plurality of scaling ratios to obtain a plurality of scaled images; respectively detecting feature points in the plurality of scaled images; and generating a feature distribution of the feature points.

On another aspect, the step of respectively detecting feature points in the plurality of scaled images comprises: performing high-frequency information enhancement on the plurality of scaled images and detecting the feature points in the scaled images after the high-frequency information enhancement; the step of generating a feature distribution of the feature points comprises: determining main features describing the feature points and generating a histogram of a distribution of the main feature.

On another aspect, the step of determining, on the basis of the image parameters, an image quality assessment result associated with a corresponding metric comprises: carrying out machine learning on the feature distribution by means of a trained first machine learning model to output a subjective score of the corresponding magnetic resonance image.

On another aspect, the step of processing the magnetic resonance image comprises: generating a histogram of the intensity of the magnetic resonance image, and fitting the histogram of intensity to a first function to generate a signal distribution; and generating a histogram of the gradient of the magnetic resonance image, and fitting the histogram of the gradient to a second function to generate a noise distribution.

On another aspect, the first function is a Gaussian function and the second function is a Gamma function.

On another aspect, the step of determining, on the basis of the image parameters, an image quality assessment result associated with a corresponding metric comprises: obtaining at least one of a signal-to-noise ratio and a contrast-to-noise ratio based on the signal distribution and the noise distribution; and normalizing at least one of the signal-to-noise ratio and the contrast-to-noise ratio based on the scan parameters applied when performing the magnetic resonance scan.

On another aspect, the step of processing the magnetic resonance image comprises: extracting edge information from the magnetic resonance image; obtaining distribution information of the edge information in a plurality of directions; generating histograms of the distribution information in the plurality of directions; and performing function fitting on the histograms of the distribution information in the plurality of directions and determining fitting parameters.

On another aspect, a mean-subtracted contrast-normalized coefficient of the magnetic resonance image is extracted as the edge information; multi-directional filtering is performed on the mean-subtracted contrast-normalized coefficient to obtain a multi-directionally filtered coefficient to serve as the distribution information of the edge information in the plurality of directions; and the fitting parameters are determined by fitting a histogram of the multi-directionally filtered coefficient to a Gaussian function.

On another aspect, the step of determining, on the basis of the image parameters, an image quality assessment result associated with a corresponding metric comprises: carrying out machine learning of the fitting parameters by means of a trained second machine learning model to output a determination result as to the presence or absence of motion artifacts.

On another aspect, the step of processing the magnetic resonance image comprises: performing uniformity correction on the magnetic resonance image to obtain a corrected image; and determining differences between the magnetic resonance image and the corresponding corrected image.

The step of determining, on the basis of the image parameters, an image quality assessment result associated with the metric comprises: determining the shading of the magnetic resonance image based on the differences.

On another aspect, generating an analysis report related to the performance of a magnetic resonance imaging system based on the image quality assessment result.

Another aspect of the present invention further provides a computer-readable storage medium, comprising a stored computer program, wherein the method for magnetic resonance image quality assessment according to any one of the above aspects is performed when the computer program is run.

Another aspect of the present invention further provides a magnetic resonance imaging system, comprising: an image generation device, configured to perform a magnetic resonance scan to generate a magnetic resonance image; and a processor, configured to perform the method for magnetic resonance image quality assessment according to any one of the above aspects.

On another aspect, the system further comprises a memory in which a pre-established database is stored, the database comprising information associated with a magnetic resonance image, the information associated with the magnetic resonance image comprising one or more of time information about when the magnetic resonance image is generated by the image generation device, scan parameters used when the magnetic resonance scan is performed, human anatomy information used when the magnetic resonance scan is performed, and/or information of a product that performs the magnetic resonance scan.

On another aspect, the processor comprises a result output module, configured to receive, via a user interface, user-determined information associated with the magnetic resonance image, and output, via the user interface, an image quality assessment result for a corresponding magnetic resonance image based on the information associated with the magnetic resonance image.

On another aspect, the result output is further configured to receive, via the user interface, a user-determined metric for assessing image quality and output an image quality assessment result associated with the selected metric.

It should be understood that the brief description above is provided to introduce, in simplified form, some concepts that will be further described in the detailed description. The brief description above is not meant to identify key or essential features of the claimed subject matter. The scope is defined uniquely by the claims that follow the detailed description. Furthermore, the claimed subject matter is not limited to implementations that solve any disadvantages noted above or in any section of the present disclosure.

BRIEF DESCRIPTION OF THE DRAWINGS

The present invention will be better understood by reading the following description of non-limiting embodiments with reference to the accompanying drawings, where.

The accompanying drawings illustrate components, systems, and methods described in the magnetic resonance imaging method and system. Together with the following description, the accompanying drawings illustrate and explain structural principles, methods and principles described herein. In the accompanying drawings, the thickness and dimensions of the components may be enlarged or otherwise modified for clarity. Well-known structures, materials, or operations are not shown or described in detail to avoid obscuring the components, systems, and methods described.

DETAILED DESCRIPTION

Specific implementations of the present invention will be described below. It should be noted that in the specific description of these embodiments, for the sake of brevity and conciseness, this specification may not describe all features of the actual implementations in detail. It should be understood that in the actual implementation process of any implementations, just as in the process of any engineering project or design project, a variety of specific decisions are often made to achieve specific goals of the developer and to meet system-related or business-related constraints, which may also vary from one implementation to another. Furthermore, it should also be understood that although efforts made in such development processes may be complex and tedious, for those of ordinary skill in the art related to the content disclosed in the present invention, some design, manufacture, or production changes based on the technical content disclosed in the present disclosure are only common technical means, and should not be construed as insufficient content of the present disclosure.

Unless otherwise defined, the technical or scientific terms used in the claims and the description are as they are usually understood by those of ordinary skill in the art to which the present invention pertains. Terms such as "first," "second," and similar terms used in this specification and claims do not denote any order, quantity, or importance, but are only intended to distinguish different constituents. The terms "one" or "a/an" and similar terms do not denote a limitation of quantity, but rather the presence of at least one. The terms "include" or "comprise" and similar terms mean that an element or article preceding the term "include" or "comprise" encompasses elements or articles and their equivalent elements listed after "include" or "comprise," and does not exclude other elements or articles. The terms "connect" or "connected" and similar words are not limited to physical or mechanical connections, and are not limited to direct or indirect connections. Furthermore, it should be understood that references to "an embodiment" or "embodiments" of the present disclosure are not intended to be construed as excluding the existence of additional implementations that also incorporate the referenced features.

Figure 1:
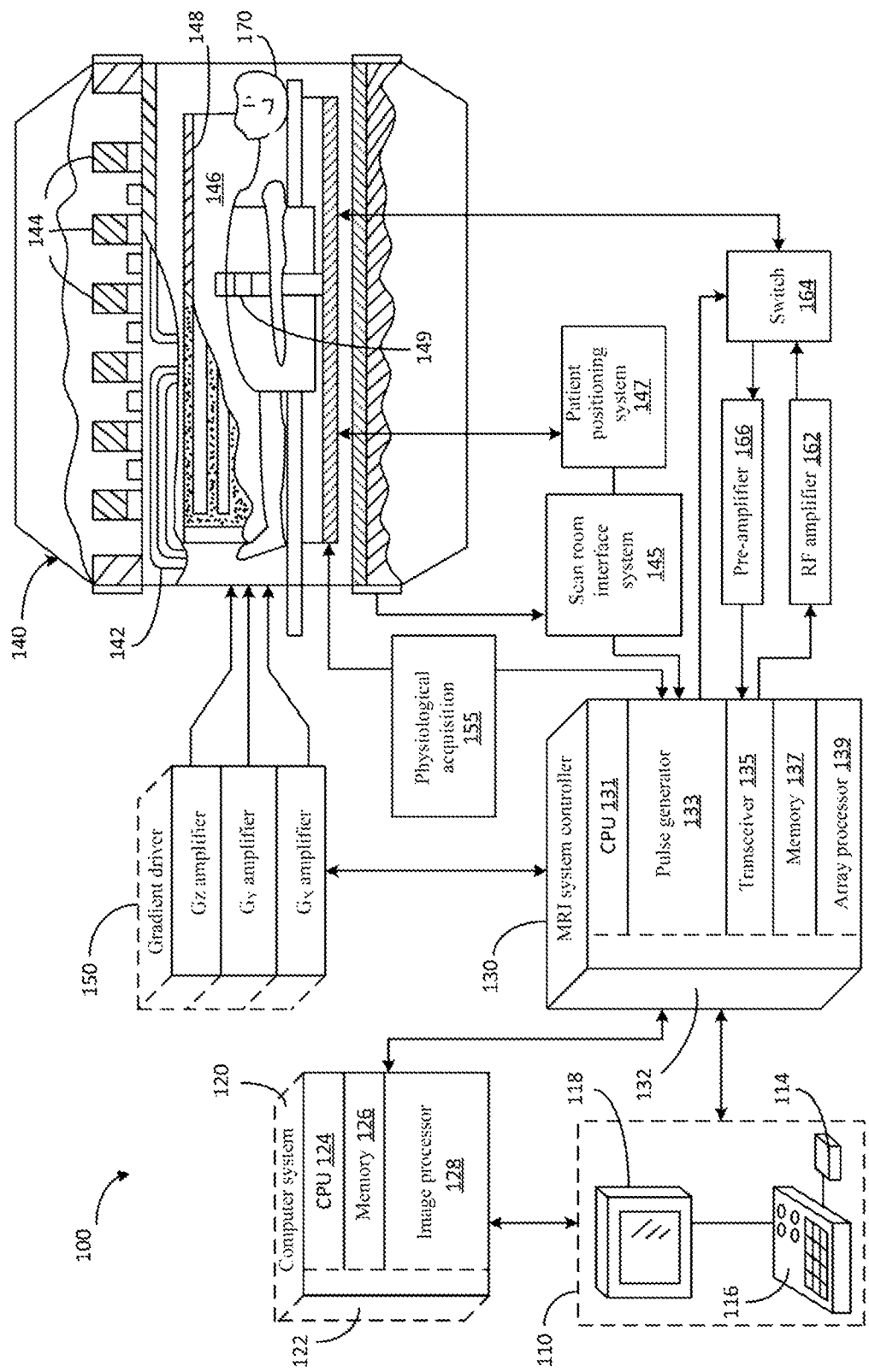
FIG. 1 illustrates a schematic diagram of an exemplary MRI system 100 according to some embodiments.

Referring to FIG. 1, a schematic diagram of an exemplary magnetic resonance imaging (MRI) system 100 according to some embodiments is shown. The operation of the MRI system 100 is controlled by an operator workstation 110 that includes an input device 114, a control panel 116 and a display 118. The input device 114 may be a joystick, a keyboard, a mouse, a trackball, a touch-activated screen, a voice control, or any similar or equivalent input device. The control panel 116 may include a keyboard, a touch-activated screen, a voice control, a button, a slider, or any similar or equivalent control device. The operator workstation 110 is coupled to and in communication with a computer system 120 that enables the operator to control (e.g., through an input device) the generation and viewing of images on the display 118, and also to perform human-computer interaction through the user interface displayed on the display 118. The human-computer interaction can be used to: determine scan parameters, perform operations for image processing, select images and view quality assessment results for the selected images, etc. The computer system 120 includes various components that communicate with each other via an electrical and/or data connection module 122. The connection module 122 may be a direct wired connection, a fiber optic connection, a wireless communication link, etc. The computer system 120 may include a central processing unit (CPU) 124, a memory 126, and an image processor 128. In some embodiments, the image processor 128 may be replaced by image processing functions implemented in a CPU 124. The computer system 120 may be connected to an archive media device, a persistent or backup storage or a network. The computer system 120 may be coupled to and in communication with a separate MRI system controller 130.

The MRI system controller 130 includes a set of components that communicate with each other via an electrical and/or data connection module 132. The connection module 132 may be a direct wired connection, a fiber optic connection, a wireless communication link, etc. The MM system controller 130 may include a CPU 131, a sequence pulse generator 133 in communication with the operator workstation 110, a transceiver (or an RF transceiver) 135, a memory 137, and an array processor 139. In some embodiments, the sequence pulse generator 133 may be integrated into a resonance assembly 140 of the MRI system 100. The MRI system controller 130 may receive commands from the operator workstation 110 to indicate an MRI scan sequence to be executed during an MM scan. The MM system controller 130 is further coupled to and in communication with a gradient driver system 150, which is coupled to a gradient coil assembly 142 to generate a magnetic field gradient during the MRI scan.

The sequence pulse generator 133 may further receive data from a physiological acquisition controller 155, which receives signals from a number of different sensors, such as electrocardiogram (ECG) signals from electrodes attached to a patient, which are connected to the subject or patient 170 undergoing an MRI scan. The sequence pulse generator 133 is coupled to and in communication with a scan room interface system 145 that receives signals from various sensors associated with the state of the resonance assembly 140. The scan room interface system 145 is further coupled to and in communication with a patient positioning system 147 that sends and receives signals to control movement of a patient table to a desired position to perform the MRI scan.

The MRI system controller 130 provides gradient waveforms to the gradient driver system 150, and the gradient driver system includes $G_x$, $G_y$ and $G_z$ amplifiers, etc. Each $G_x$, $G_y$ and $G_z$ gradient amplifier excites a corresponding gradient coil in the gradient coil assembly 142 so as to generate a magnetic field gradient used to spatially encode an MR signal during the MM scan. The gradient coil assembly 142 is disposed within the resonance assembly 140, and the resonance assembly further includes a superconducting magnet having a superconducting coil 144 that, in operation, provides a static uniform longitudinal magnetic field $B_0$ throughout a cylindrical imaging volume 146. The resonance assembly 140 further includes an RF body coil 148, which, in operation, provides a lateral magnetic field $B_1$, and the lateral magnetic field $B_1$ is substantially perpendicular to $B_0$ throughout the cylindrical imaging volume 146. The resonance assembly 140 may further include an RF surface coil 149 for imaging different anatomical structures of the patient undergoing the MRI scan. The RF body coil 148 and the RF surface coil 149 may be configured to operate in a transmit and receive mode, a transmit mode, or a receive mode.

The subject or patient 170 of the MRI scan may be positioned within the cylindrical imaging volume 146 of the resonance assembly 140. A transceiver 135 in the MRI system controller 130 generates RF excitation pulses that are amplified by an RF amplifier 162 and provided to the RF body coil 148 through a transmit/receive switch (T/R switch) 164.

As described above, the RF body coil 148 and the RF surface coil 149 may be used to transmit RF excitation pulses and/or receive resulting MR signals from the patient undergoing the MM scan. The MR signals emitted by excited nuclei in the patient of the MRI scan may be sensed and received by the RF body coil 148 or the RF surface coil 149 and sent back to a pre-amplifier 166 through the T/R switch 164. The T/R switch 164 may be controlled by a signal from the sequence pulse generator 133 to electrically connect the RF amplifier 162 to the RF body coil 148 in the transmit mode and to connect the pre-amplifier 166 to the RF body coil 148 in the receive mode. The T/R switch 164 may further enable the RF surface coil 149 to be used in the transmit mode or the receive mode.

In some embodiments, the MR signals sensed and received by the RF body coil 148 or the RF surface coil 149 and amplified by the pre-amplifier 166 are stored in a memory 137 for post-processing as a raw k-space data array. A reconstructed magnetic resonance image may be obtained by transforming/processing the stored raw k-space data.

In some embodiments, the MR signals sensed and received by the RF body coil 148 or the RF surface coil 149 and amplified by the pre-amplifier 166 are demodulated, filtered, and digitized in a receiving portion of the transceiver 135, and transmitted to the memory 137 in the MRI system controller 130. For each image to be reconstructed, the data is rearranged into separate k-space data arrays, and each of these separate k-space data arrays is input to the array processor 139, which is operated to convert the data into an array of image data by Fourier transform.

The array processor 139 uses transform methods, most commonly Fourier transform, to create images from the received MR signals. These images are transmitted to the computer system 120 and stored in the memory 126. In response to commands received from the operator workstation 110, the image data may be stored in a long-term storage, or may be further processed by the image processor 128 and transmitted to the operator workstation 110 for presentation on the display 118.

In various embodiments, components of the computer system 120 and the Mill system controller 130 may be implemented on the same computer system or on a plurality of computer systems. It should be understood that the MM system 100 shown in FIG. 1 is intended for illustration. Suitable MM systems may include more, fewer, and/or different components.

The Mill system controller 130 and the image processor 128 may separately or collectively include a computer processor and a storage medium. The storage medium records a predetermined data processing program to be executed by the computer processor. For example, the storage medium may store a program used to implement scanning processing (such as a scan flow and an imaging sequence), image reconstruction, image processing, etc. For example, the storage medium may store a program used to implement the method for magnetic resonance image quality assessment according to the embodiments of the present invention. The storage medium may include, for example, a ROM, a floppy disk, a hard disk, an optical disk, a magneto-optical disk, a CD-ROM, or a non-volatile memory card.

Figure 2:
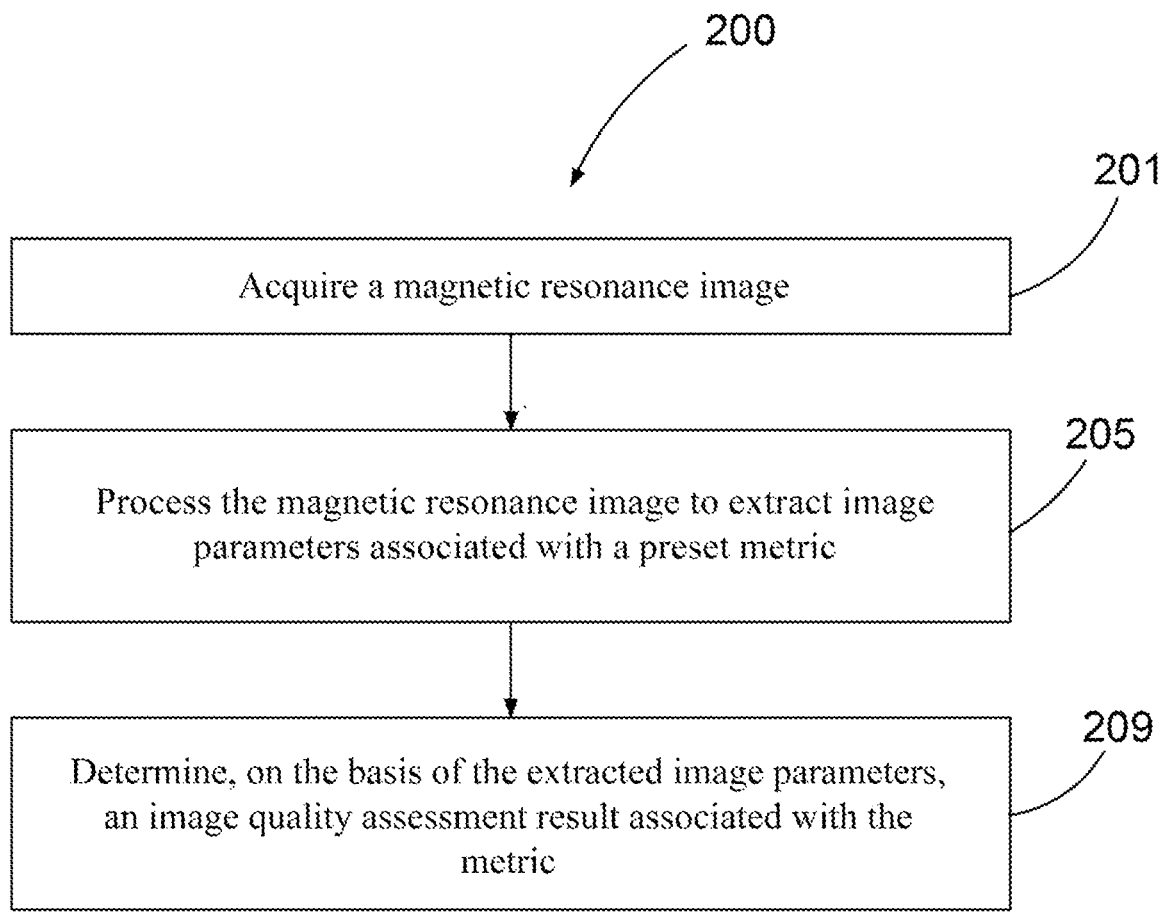
FIG. 2 illustrates a flowchart 200 of a method for magnetic resonance image quality assessment of an embodiment of the present invention.

Referring to FIG. 2, a flowchart 200 of a method for magnetic resonance image quality assessment of an embodiment of the present invention is illustrated. In step 201, a magnetic resonance image is acquired. In step 205, the magnetic resonance image is processed to extract image parameters associated with a preset metric. In step 209, an image quality assessment result associated with this metric is determined based on the extracted image parameters.

The above preset metric may include one or more of a signal-to-noise ratio (SNR), a contrast-to-noise ratio (CNR), motion artifacts, shading, and/or a subjective (e.g., human visual) score.

In the above embodiment, by performing image processing based on the preset metric to extract the image parameters related to such metric and performing quality assessment based on the image parameters, the accuracy of the quality assessment can be improved, and the quality assessment results associated with different metrics may be useful for different application requirements.

Such a quality assessment method can be used for system performance evaluation, tracing influencing factors in an image generation process, and improving system maintenance.

For example, currently routine maintenance of MRI products is usually planned at fixed intervals, such as half a year or a quarter, which are usually set based on experience. This approach may have the following problems: when the product performance is good, the maintenance frequency is too high, resulting in inefficient use of human resources for on-site maintenance; when the product performance decreases, the maintenance frequency is too low, resulting in failures before maintenance or unacceptable image quality, or in more serious cases, it may lead to increased system downtime and incur losses to the hospital. With the embodiment of the present invention, when a new magnetic resonance image is generated by magnetic resonance scanning, the method for image quality assessment of the embodiment of the present invention may be run automatically or based on input instructions to generate image quality assessment results associated with multiple metrics. Therefore, the current operating state of a system may be determined based on the assessment results obtained using these metrics, and timely warnings or automatic communication with remote maintenance engineers may be established in case of abnormal system performance.

As another example, in recent years, third-party providers capable of providing product maintenance have emerged and some of their operations during product maintenance (e.g., replacement of critical components) may cause serious product performance degradation problems, and image quality assessment of the generated magnetic resonance images associated with multiple metrics through embodiments of the present invention enables clarification of the root cause of performance degradation by consulting the trend of change of the assessment results (or other possible ways) to provide a timely response, and the impact of such operations may be quantified by issuing appropriate warnings.

In one embodiment, the magnetic resonance image acquired in step 203 may be acquired based on performing a magnetic resonance scan, for example, once a magnetic resonance scan (or imaging) process is performed by a magnetic resonance imaging system similar to system 100 described above and a reconstructed magnetic resonance image is generated, the method for magnetic resonance image quality assessment of an embodiment of the present invention may be initiated automatically or based on input instructions at the end of that process to perform quality assessment of that generated magnetic resonance image. The result of the above quality assessment may be stored in a database.

Figure 3:
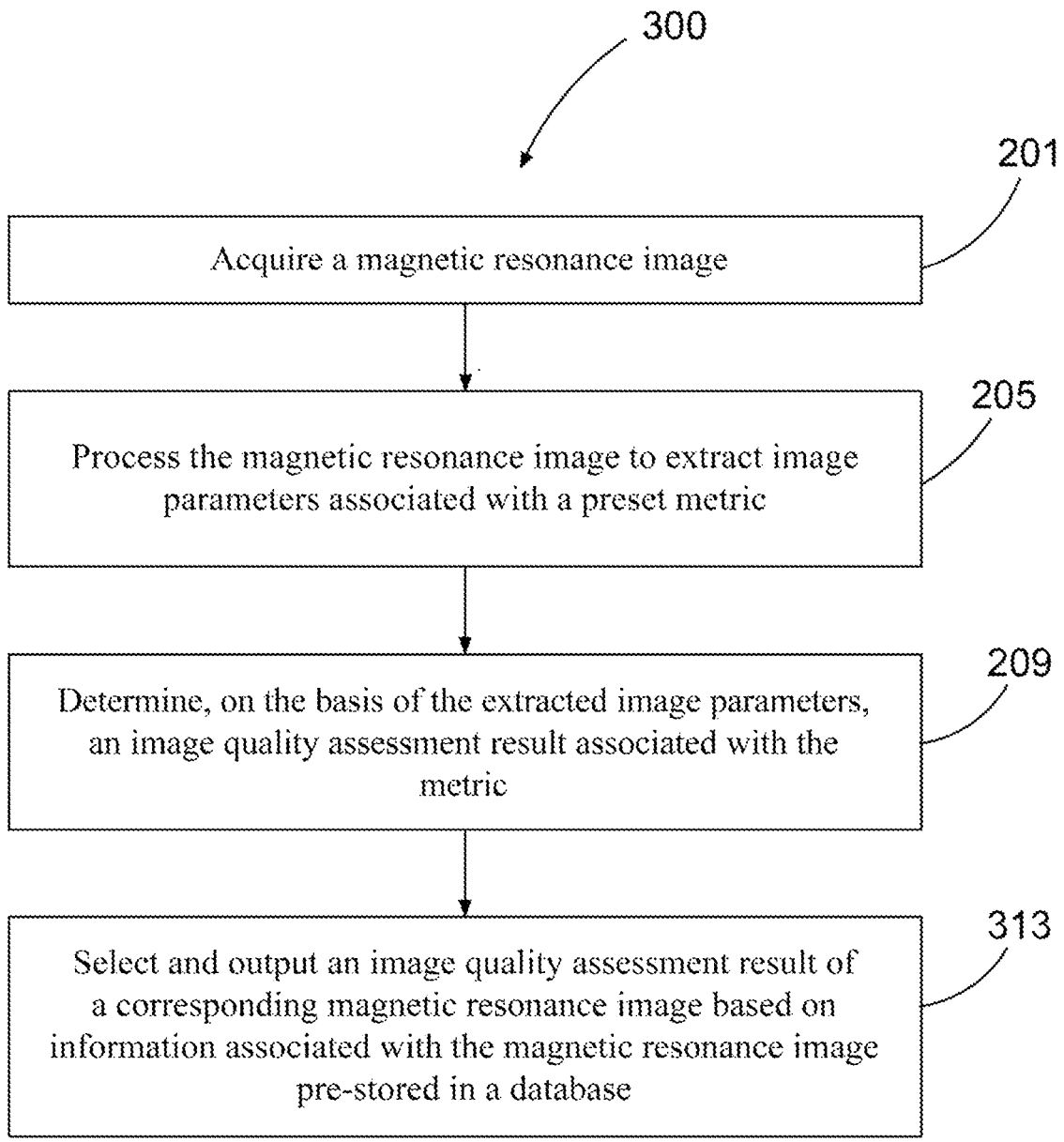
FIG. 3 illustrates a flowchart 300 of a method for magnetic resonance quality assessment of another embodiment of the present invention.

FIG. 3 illustrates a flowchart 300 of a method for magnetic resonance quality assessment of another embodiment of the present invention is illustrated, further comprising step 313: selecting and outputting an image quality assessment result of a corresponding magnetic resonance image based on information associated with the magnetic resonance image pre-stored in the database. The database may be stored in the computer system 120 described above (e.g., in memory 126) or in a separate storage system capable of communicating with the system 100.

As mentioned earlier, the database includes image quality assessment results which may be retrieved in various applications.

The quality assessment results may be retrieved, for example, by setting a lookup condition, which may be achieved through a user interface, and such user interface may be displayed, for example, by display 118. Specifically, the database may also include information associated with the magnetic resonance image, and in step 313, an image quality assessment result of a corresponding magnetic resonance image may be selected and output (e.g., displayed) based on the associated information.

By storing the information associated with the images stored in the database rather than the images themselves, storage of duplicate images may be avoided (e.g., the images are already stored in the memory 126 of the system 100), and by storing the associated information and the image quality assessment results, it is possible to implement embodiments of the present invention with only a sufficiently lightweight database. However, in other embodiments, the database may also be used to store magnetic resonance images.

The above associated information may be generated during the magnetic resonance scan process and recorded/collected in the database afterwards. For example, when a new magnetic resonance scan process is started, the corresponding time information is recorded, and scan settings (e.g., imaging sequence selection, coil selection, anatomical structure selection and so on) are configured. The setting information is also collected and stored in the database. The association information may include one or more of information about the time at which the magnetic resonance image is generated, scan parameters used when the magnetic resonance scan is performed, human anatomy information used when the magnetic resonance scan is performed, and/or information about a product that performs the magnetic resonance scan.

Figure 4:
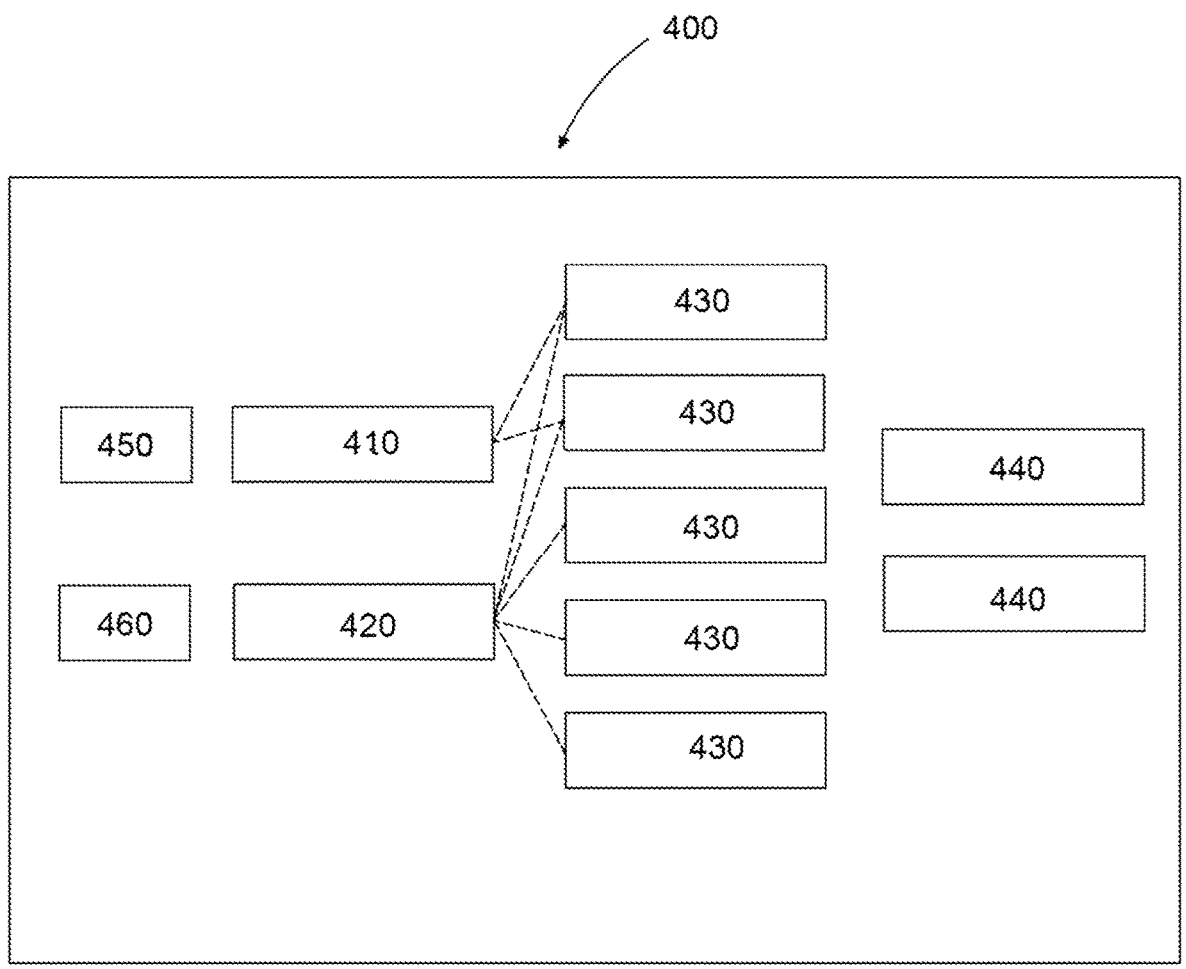
FIG. 4 illustrates a user interface 400 of an example of the present invention.

FIG. 4 illustrates an example of a user interface 400, which includes a time determination module 410 and an anatomical structure determination module 420. By operating the time determination module 410, a time range or a specific time may be entered, and image quality assessment results of magnetic resonance images produced during that time range or at that specific time in the database are selected and output. Image quality assessment results of magnetic resonance images of specific anatomical structures may be selected by operating the anatomical structure determination module 420.

After the user confirms the above operation, the corresponding image quality assessment result 430 is retrieved and can be displayed, for example, directly on the user interface 400, or can be further used to perform system performance analysis, such that a system performance analysis result 440 is displayed on the user interface 400.

Although automatic image quality assessment of the generated image performed after scanning is described above, it is also possible to store the associated information in the database first and then retrieve the magnetic resonance image related to the associated information based on the user's selection of the associated information, and perform quality assessment of the retrieved image and output the assessment result.

Figure 5:
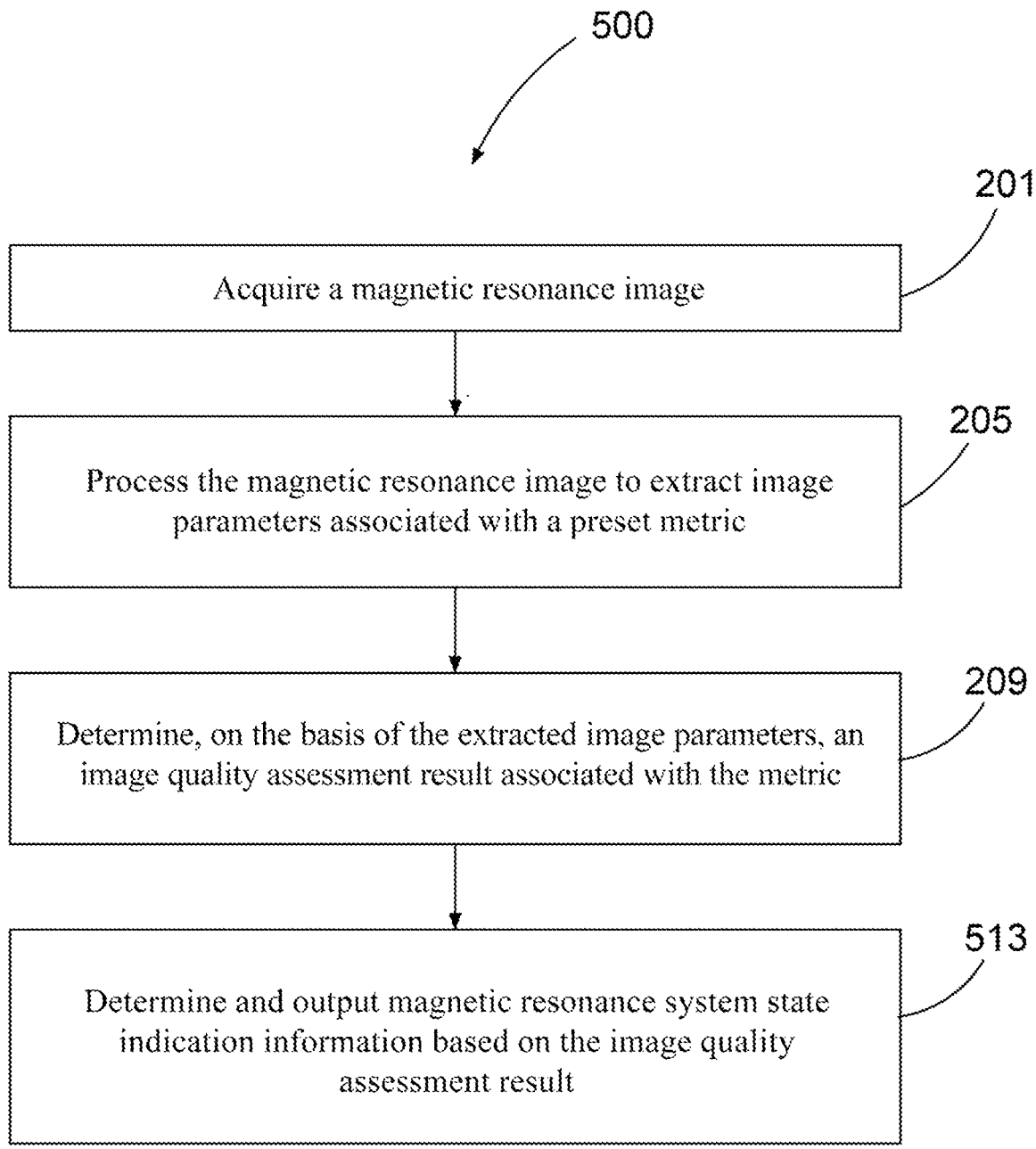
FIG. 5 illustrates a flowchart 500 of a method for magnetic resonance image quality assessment of another embodiment of the present invention.

FIG. 5 illustrates a flowchart 500 of a method for magnetic resonance image quality assessment of another embodiment of the present invention, further comprising step 513: determining and outputting state indication information of the magnetic resonance system based on the image quality assessment result. The state indication information may include the system performance analysis result described above. For example, the state indication information may be used to indicate whether the system has good performance or a performance problem occurs on the basis of the results of image quality assessment performed under various metrics. The state indication information may also include alarm information provided when there is a serious performance problem.

Figure 6:
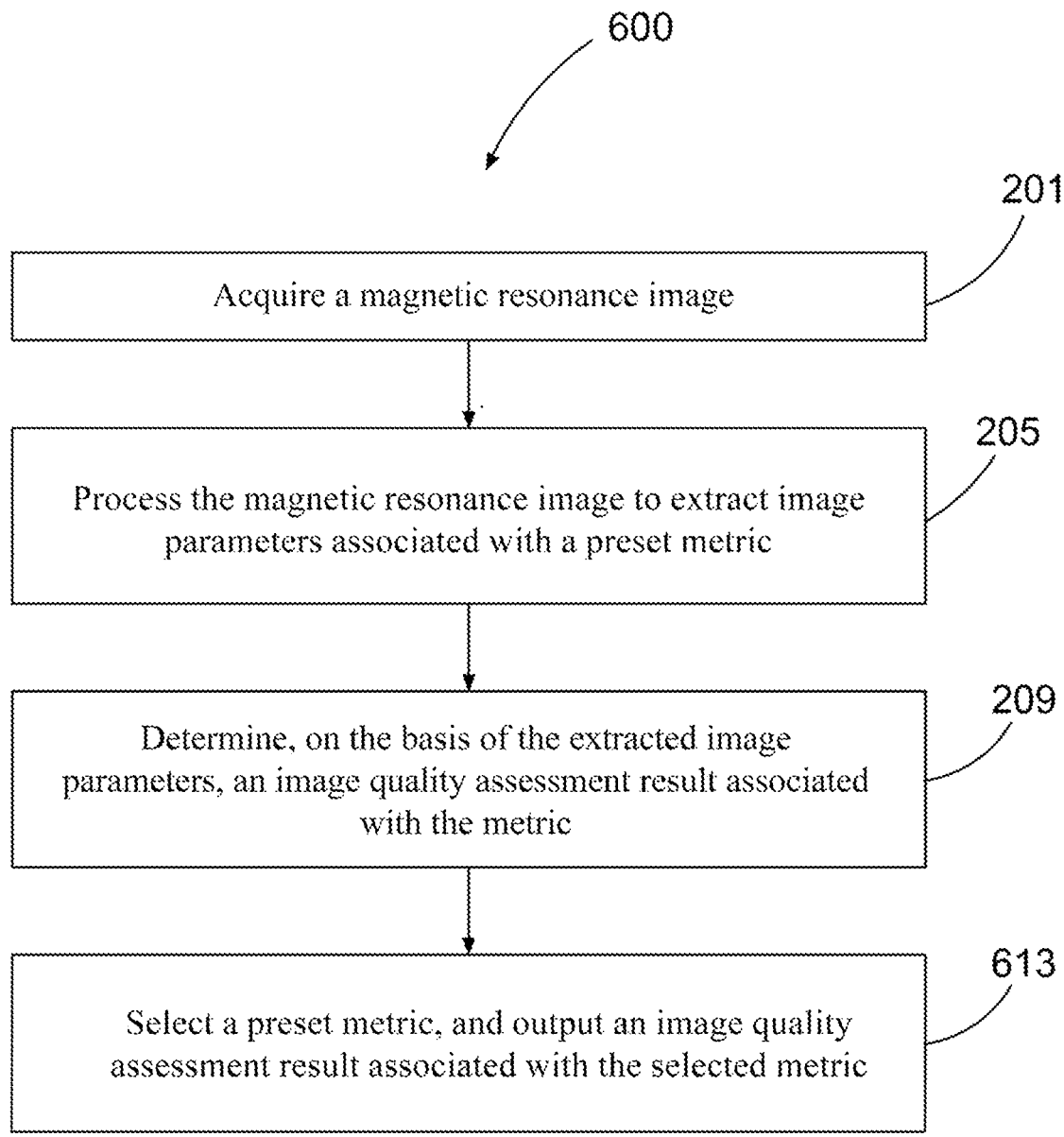
FIG. 6 illustrates a course diagram 600 of a method for magnetic resonance image quality assessment of another embodiment of the present invention.

FIG. 6 illustrates a flowchart 600 of a method for magnetic resonance image quality assessment of another embodiment of the present invention, further comprising step 613: selecting a preset metric and outputting an image quality assessment result associated with the selected metric. In this way, it is possible to output only results of image quality assessment performed under specific metrics as required instead of all of the information. For example, for physicians, the metrics of interest may be a subjective score, a signal-to-noise ratio, etc. While for equipment maintenance personnel, they may focus on more metrics. Therefore, optional modules may be provided to realize personalized output results.

Specifically, in step 613, one of at least two image quality analysis modes may be selected, wherein the at least two image quality analysis modes include different combinations of metrics.

In one example, the above selection may be implemented via the user interface 400. Specifically, the user interface 400 further includes a clinical mode module 450 and a maintenance mode module 460. The output image quality assessment results only relate to the metrics that concern the physicians when the user determines to enable the clinical mode module 450 through their operations, while the output image quality assessment results relate to more or different metrics when the user determines to activate the maintenance mode module 460 through their operations.

The selection of the above modes may also be carried out automatically by user name detection/authentication. For example, if the current user is determined to be a clinician or hospital employee, then a first image quality analysis mode (clinical mode) is enabled, while if the current user is determined to be a system maintainer, then a second image quality analysis mode (maintenance mode) is enabled.

In the embodiment of the present invention, the image parameters associated with the preset metrics are extracted by processing the magnetic resonance images, so that the parameters extracted by image processing are suitable for outputting assessment results that are more relevant to the metrics, thereby improving the accuracy of quality assessment and multi-dimensional assessment results may be obtained.

Figure 7:
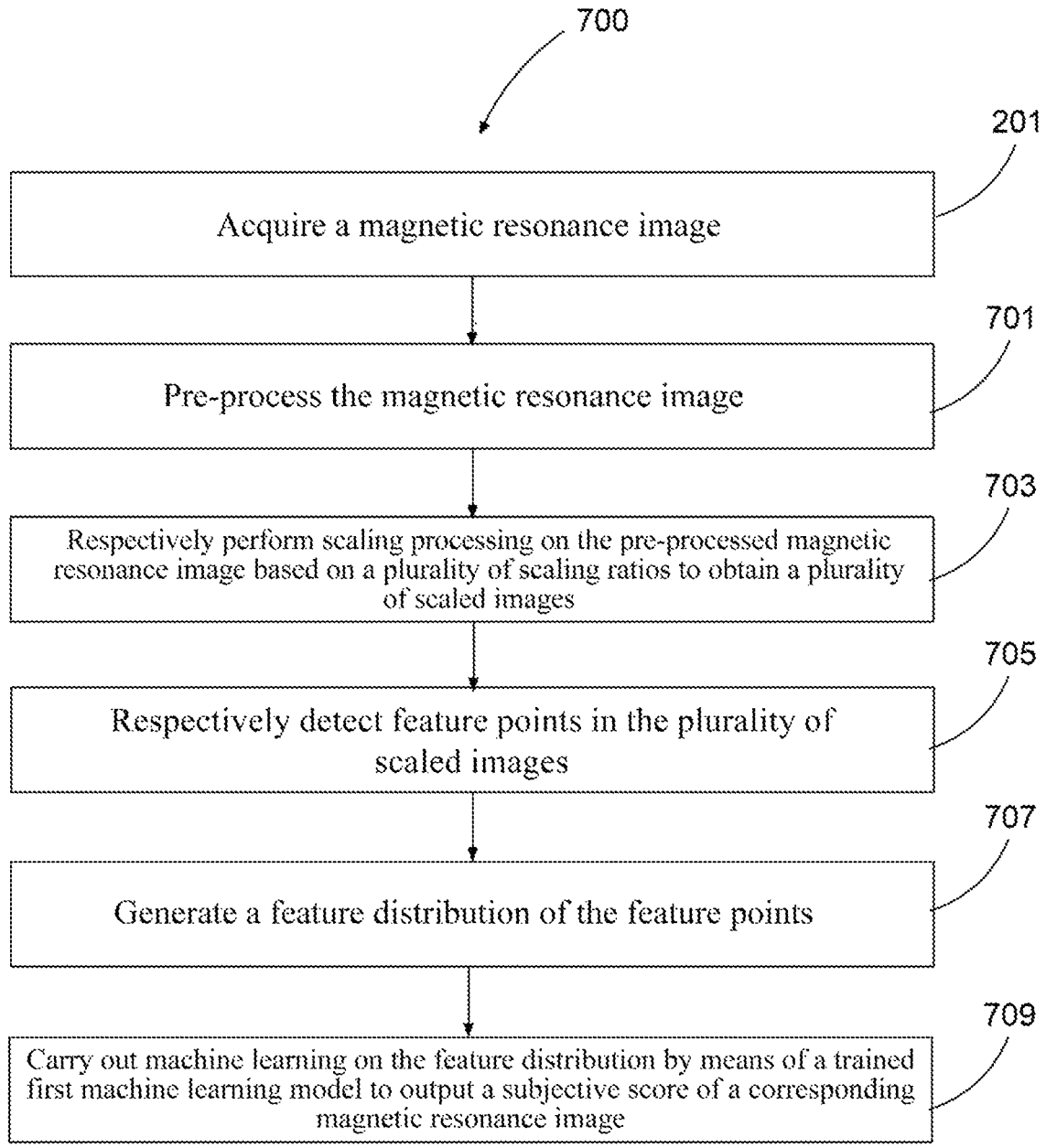
FIG. 7 illustrates a flowchart 700 of a method for magnetic resonance image quality assessment of an embodiment of the present invention.

Referring to FIG. 7, a flowchart 700 of a method for magnetic resonance images quality assessment of an embodiment of the present invention is illustrated, wherein an assessment result associated with a subjective score is obtained.

Step 205 above may specifically include steps 701, 703, 705, and 707 of FIG. 7, and step 209 includes step 709.

In step 701, the magnetic resonance image is pre-processed, and such pre-processing includes normalization processing so as to improve the consistency of the resulting assessment result.

In step 703, scaling processing is performed on the pre-processed magnetic resonance image based on a plurality of scaling ratios to obtain a plurality of scaled images. For example, two different scaling ratios may be set, which may be less than 1, equal to 1 or greater than 1, thereby producing two or more images with different scaling ratios. In this way, it enables image features to be detected adequately at a later stage.

In step 705, feature points in the plurality of scaled images are detected respectively. For example, the feature points described above include pixels in the images that are predictive of visually salient features. Specifically, in step 705, high frequency information enhancement may be carried out with respect to the plurality of scaled images by means of a high frequency enhancement filter to highlight high frequency features in the images, and feature points are detected in the scaled images after such high frequency information enhancement. In one example, feature point detection may be performed by means of a multi-order filtering algorithm, which is able to detect more feature points compared with the conventional method that only performs one filtering.

In step 707, a feature distribution of the above feature points is generated. In one example, the step may specifically include the steps of: determining main features describing the feature points and generating a histogram of the distribution of the main features. Each feature point may be described by a plurality of features, which may include, for example, the difference between the feature point and its surrounding pixels and other data reflecting the characteristics of the image, and up to hundreds of such features may be generated for description. However, in the embodiment of the present invention, only one or more main features are selected to describe each feature point. The main feature is more reflective of the feedback information of human vision on the image. Therefore, a sufficiently small number of operations may be used to achieve a more accurate subjective score.

In an example, a histogram of a distribution of the main features may be generated by: subjecting the main features (or feature point description data) of each feature point to a preset mathematical operation to obtain feature data and counting the number of feature points distributed at each piece of feature data.

In step 709, machine learning is carried out with respect to the above feature distribution by means of a trained first machine learning model to output a subjective score of a corresponding magnetic resonance image.

The above machine learning model may include a deep learning network or a support vector machine model, and a training dataset thereof may include an input dataset and an output dataset, wherein the input dataset may be a distribution of main features of feature points detected in a magnetic resonance image with a known subjective score, and the output dataset may be the above known subjective score.

Suitable models may be selected among existing deep learning network models or support vector machine models to be embedded in the magnetic resonance imaging system or in a remote system communicating with the magnetic resonance imaging system.

Figure 8:
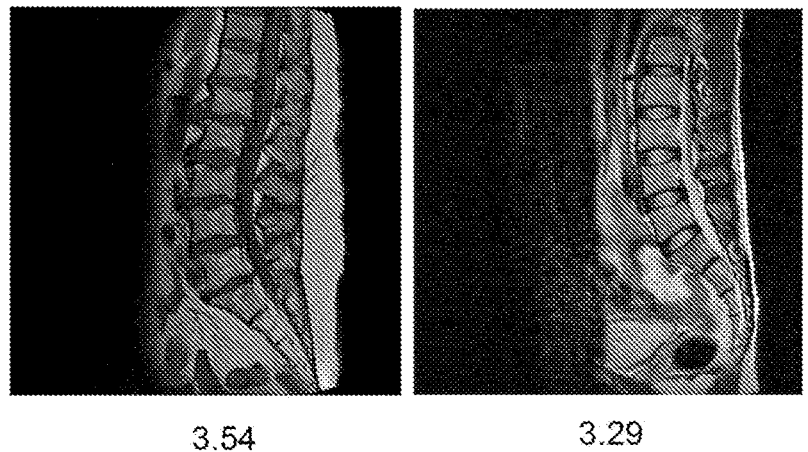
FIG. 8 illustrates quality assessment results of multiple magnetic resonance images associated with subjective score metrics obtained by using the method according to the embodiments of the present invention.
Figure 8:
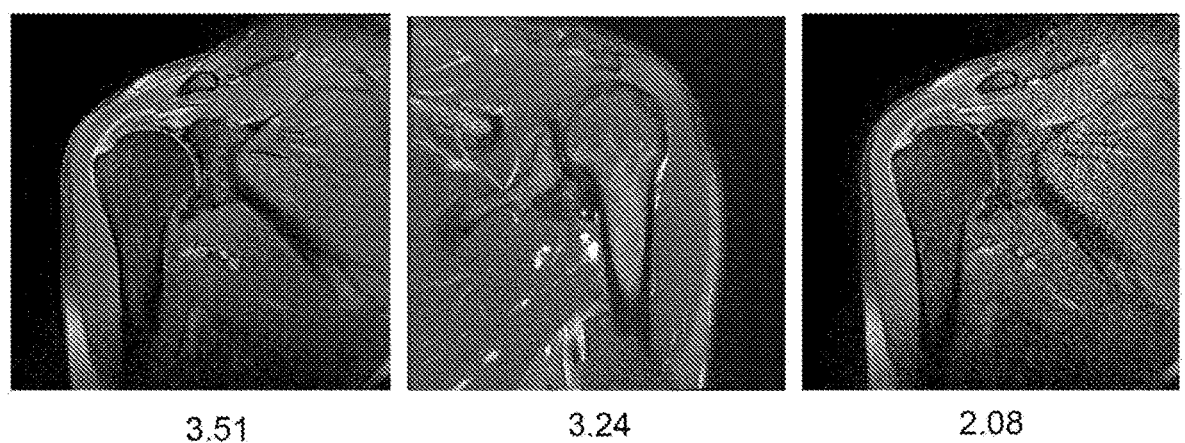

FIG. 8 illustrates quality assessment results of multiple magnetic resonance images associated with subjective score metrics obtained by using the method according to embodiments of the present invention, wherein the corresponding scores are shown, and the higher the quality under subjective score metrics is, the higher the score is, which is consistent with the physician's empirical judgment and thus can be used as a reliable basis for clinical assessment.

Figure 9:
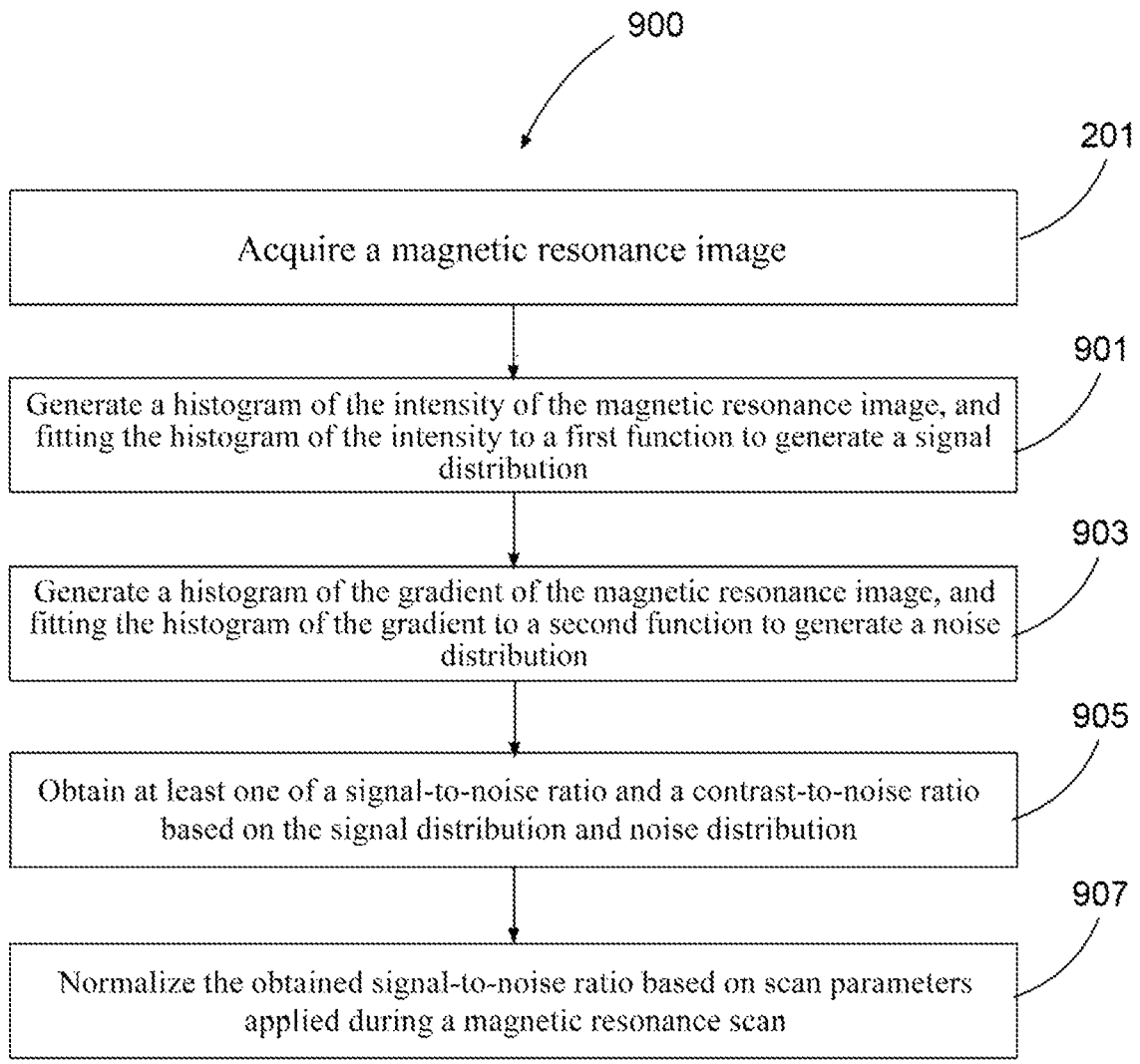
FIG. 9 illustrates a flowchart 900 of a method for magnetic resonance image quality assessment of another embodiment of the present invention.

Referring to FIG. 9, a flowchart 900 of a method for magnetic resonance image quality assessment of another embodiment of the present invention is illustrated, wherein assessment results associated with a signal-to-noise ratio and a contrast-to-noise ratio may be obtained.

Step 205 above may specifically include steps 901 and 903 of FIG. 7, and step 209 includes steps 905 and 907.

In step 901, a histogram of the intensity of the magnetic resonance image is generated, and the histogram of the intensity is fitted to a first function to generate a signal distribution. In this step, an intensity map of the magnetic resonance image may be generated, and a histogram of the intensity may be obtained based on a distribution of signal intensity values in the intensity map. In this embodiment, the histogram of the intensity is fitted to a Gaussian function to obtain a more accurate distribution of signal intensity.

In step 903, a histogram of the gradient of the magnetic resonance image is generated, and the histogram of the gradient is fitted to a second function to generate a noise distribution. In this step, a first-order derivative operation may be performed on the magnetic resonance image to obtain the gradient map thereof, and further, non-noise components in the gradient map are removed, and a histogram of the gradient is generated based on the gradient map after removing the non-noise components. In the embodiment of the present invention, the non-noise components may be removed by high-pass filtering the gradient map. The histogram of the gradient is fitted to the second function to enhance the effect of noise while reducing the effect of the image signal, thereby reflecting the noise distribution more accurately. In embodiments of the present invention, the second function is a Gamma function.

Figure 10:
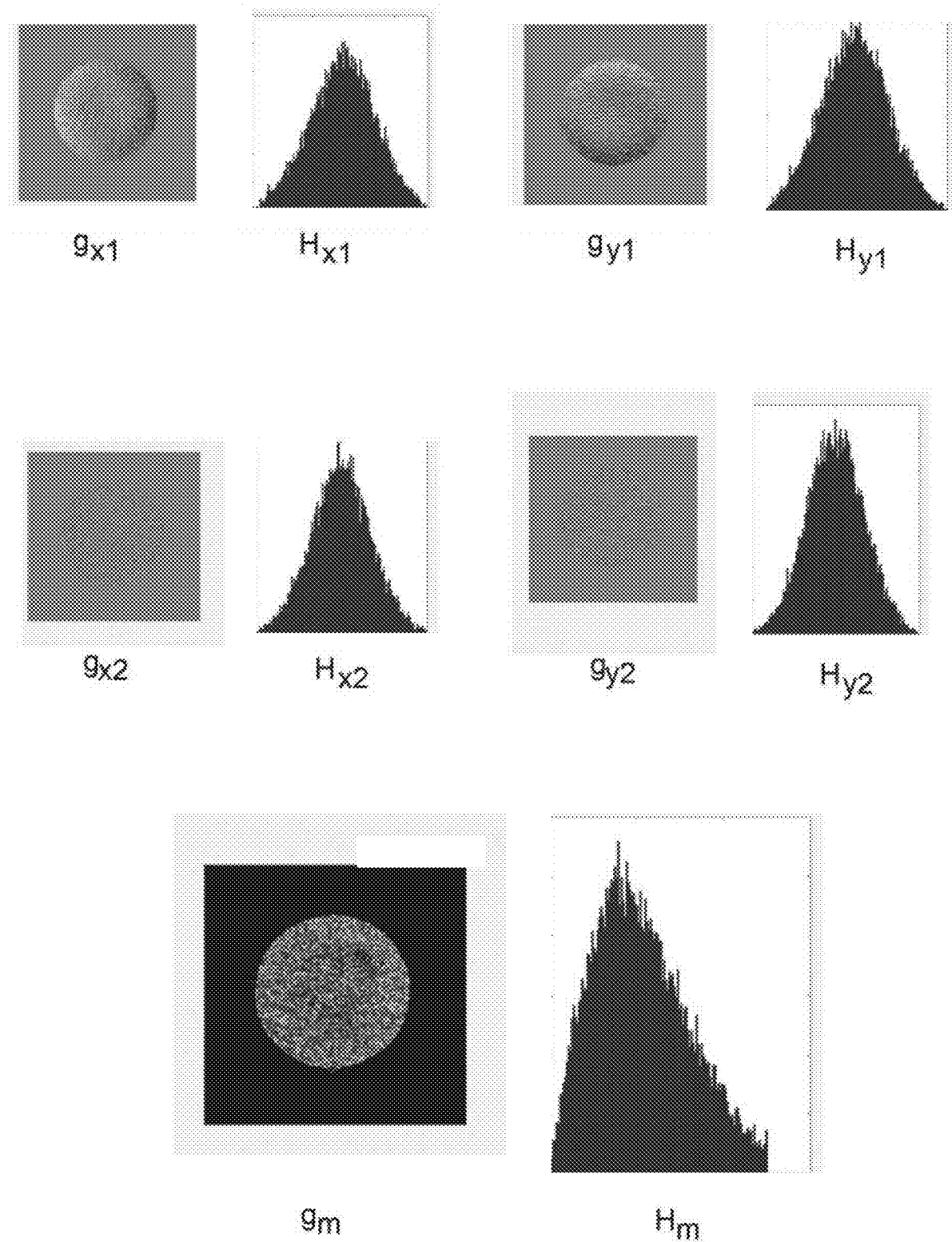
FIG. 10 illustrates an example of the present invention for generating a noise distribution of a magnetic resonance image.

Referring to FIG. 10, an example of the present invention for generating a noise distribution of a magnetic resonance image is illustrated, wherein x-direction and y-direction gradient maps $g_{x1}$ and $g_{y1}$ are generated, respectively, the gradient maps $g_{x1}$ and $g_{y1}$ are high-pass filtered to remove low-order components therein that do not reflect the noise characteristics, to obtain gradient maps $g_{x2}$ and $g_{y2}$, and a fusion operation is performed on the obtained gradient maps $g_{x2}$ and $g_{y2}$ to obtain the final gradient map $g_m$. The above fusion operation can be described by the following equation:

$$g_m = \sqrt{g_x^2 + g_y^2}.$$

Further, a histogram of the gradient map $g_m$ is generated, and a fitted histogram $H_m$ is obtained by fitting this histogram to a gamma function. By comparing histograms ($H_{x2}$ and $H_{y2}$) of the high-pass filtered gradient maps with histograms ($H_{x1}$ and $H_{y1}$) of the original gradient maps, it can be seen that the histograms ($H_{x2}$ and $H_{y2}$) have more accurate noise distributions, and therefore, the histogram $H_m$ obtained based on the fused data also has a more accurate noise distribution, which helps to subsequently obtain, on the basis of noise distributions, more accurate quality assessment results associated with metrics such as a signal-to-noise ratio and a contrast-to-noise ratio, etc.

For example, noise in a magnetic resonance image usually has a specific relationship with a variety of scan parameters, such as $$\frac{1}{N} \propto T;$$

$$\frac{1}{N} \propto \sqrt{NEX};$$

$$N \propto \sqrt{rBW};$$

$$N \propto \frac{Acq.Matrix}{Rec.Matrix};$$

Wherein, N denotes noise, T denotes the layer thickness of the excitation layer, NEX denotes the number of excitations of the magnetic resonance signal, rBW denotes the RF signal reception bandwidth, Rec. Matrix denotes the size of the reconstructed data, and Acq. Matrix denotes the size of the acquired data. Through experiments, it is found that the noise distribution obtained by using the embodiments of the present invention can better satisfy each of the above specific relationships. Therefore, the distribution thereof is more accurate.

In step 905, at least one of the signal-to-noise ratio and the contrast-to-noise ratio is obtained based on the signal distribution and the noise distribution. For example, it is understood by those skilled in the art that the ratio of the peak in the signal distribution to the peak in the noise distribution may be used to obtain the signal-to-noise ratio, and the difference between two adjacent peaks in the largest signal in the signal distribution may be used to obtain the contrast-to-noise ratio.

In step 907, the obtained signal-to-noise ratio is normalized based on the scan parameters applied when performing the magnetic resonance scan. In this way, comparisons between performance of products and image qualities based on the quality assessment of magnetic resonance images obtained with different scan parameters can be achieved.

Taking layer thickness as an example, if the first magnetic resonance image is obtained under the condition of a layer thickness of 4, it has a first noise distribution, while the second magnetic resonance image is obtained under the condition of a layer thickness of 2, and it has a second noise distribution. A first signal-to-noise ratio is obtained by performing quality assessment of the first image, while a second signal-to-noise ratio is obtained by performing quality assessment of the second image. Then the second noise distribution may be normalized to a new noise distribution under the layer thickness of 4 based on the above relationship between noise and layer thickness, and a signal-to-noise ratio under the layer thickness of 4 can be generated according to the new noise distribution.

Figure 11:
FIG. 11 illustrates quality assessment results of multiple magnetic resonance images associated with signal-to-noise ratio metrics obtained by using the method according to the embodiments of the present invention.

Referring to FIG. 11, quality assessment results of multiple magnetic resonance images associated with the signal-to-noise ratio metric obtained by using the method according to embodiments of the present invention are shown, wherein the corresponding scores were obtained, and the higher the image signal-to-noise ratio is, the higher the score is, and the results were verified to be accurate and thus can be used as a reliable basis for clinical assessment.

Table 1 below illustrates the scan parameters used for acquiring magnetic resonance images of the same site of the same volunteer by using products of three different models.

TABLE 1

|  | Product 1 | Product 2 | Product 3 |
| --- | --- | --- | --- |
| Coil | Coil A | Coil B | Coil B |
| Size of the collected data | First size | Second size | Third size |
| Size of reconstructed data | Fourth size | Fourth size | Fourth size |
| Number of excitations | 1 | 1 | 2 |
| Signal receiving bandwidth | First bandwidth | Second bandwidth | Third Bandwidth |

Table 2 below shows the assessment results of the magnetic resonance images associated with three metrics acquired by the three products in Table 1. The three metrics are: a subjective score, an image signal-to-noise ratio (without normalization), and a normalized signal-to-noise ratio obtained after normalizing the image signal-to-noise ratio based on the multiple scan parameters in Table 1. The numbers in Table 2 are used only to compare the scores with different products.

TABLE 2

|  | Product 1 | Product 2 | Product 3 |
| --- | --- | --- | --- |
| Subjective score | 4.8 | 4.8 | 5.0 |
| Image signal-to-noise ratio | 61 | 99 | 118 |
| Normalized signal-to-noise ratio | 7.7 | 8.4 | 6.6 |

By analyzing Table 2, it is found that although Product 3 has a higher subjective score and obtains a higher signal-to-noise ratio image, Product 3 has a higher normalized signal-to-noise ratio, indicating that the image quality degradation caused by Product 3 may only be caused by the parameter settings only, and it has a better system performance compared with the other two products.

Embodiments of the present invention may also be used for performance analysis of individual products, and based on such analysis, corresponding analysis reports can be obtained, which can be read or retrieved by the user based on, for example, the user interface operations described above.

Figure 12:
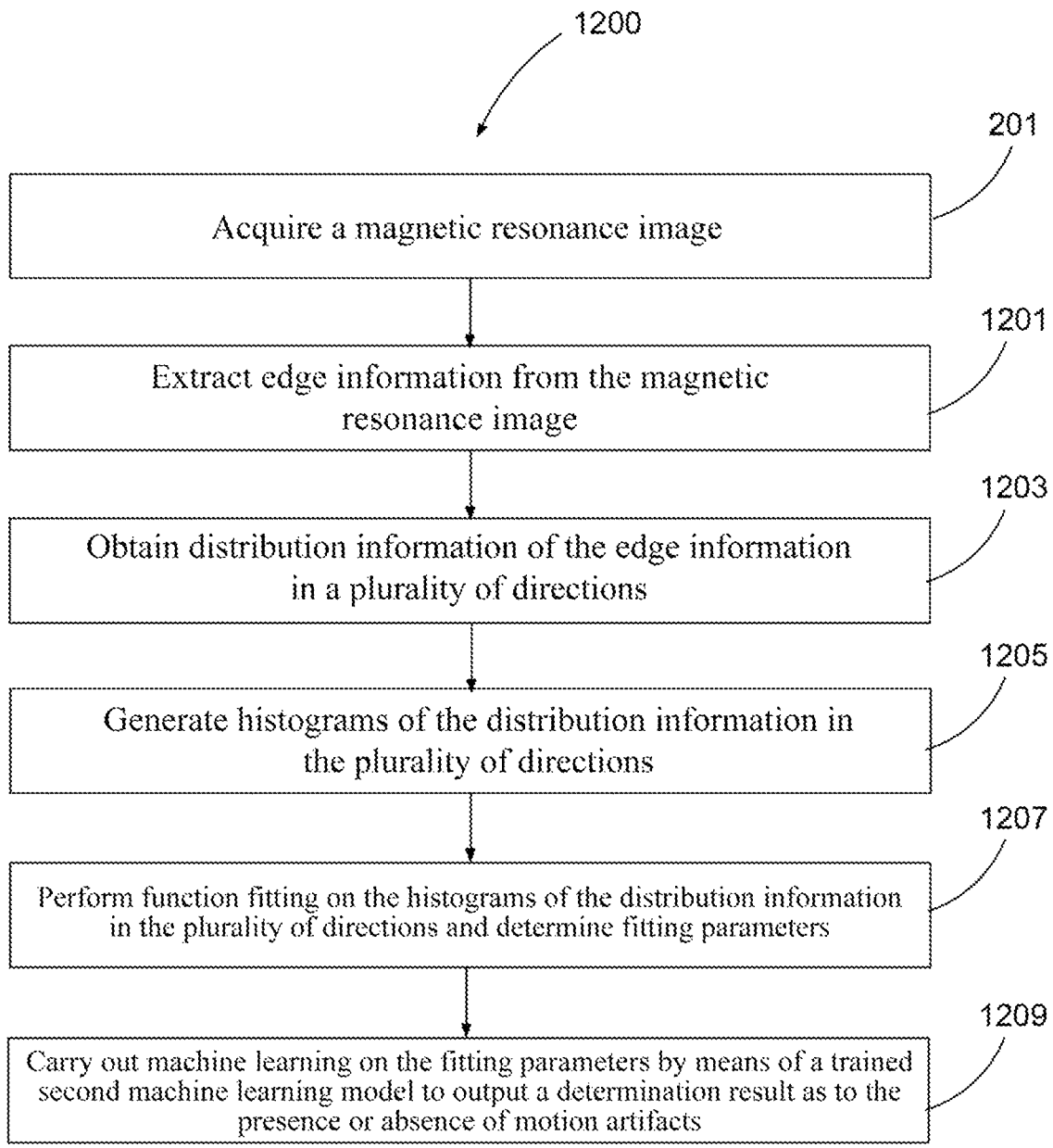
FIG. 12 illustrates a flowchart 1200 of a method for magnetic resonance image quality assessment of another embodiment of the present invention.

Referring to FIG. 12, a flowchart 1200 of a method for magnetic resonance image quality assessment of another embodiment of the present invention is illustrated, wherein an assessment result associated with motion artifact metrics can be obtained.

Wherein, step 205 for processing the magnetic resonance image may include steps 1201, 1203, 1205 and 1207. Step 209 of determining, on the basis of the image parameters, the image quality assessment result associated with the corresponding metric may include step 1209.

In step 1201, the edge information of the magnetic resonance image is extracted, and in this step, for example, an MSCN (Mean-Subtracted Contrast-Normalized) coefficient of the magnetic resonance image may be extracted as the edge information, wherein the MSCN coefficient may be obtained by the following equation:

$$I' = \frac{I - \mu}{\sigma + C},$$

wherein, I is the magnetic resonance image to be assessed, $\mu$ is the signal mean of the magnetic resonance image I, $\sigma$ is the signal standard deviation of the magnetic resonance image I, and C is a constant.

In step 1203, the distribution information of the edge information in a plurality of directions is obtained. Specifically, the MSCN coefficient may be multi-directionally filtered to obtain a multi-directionally filtered coefficient as the distribution information of the edge information in a plurality of directions.

The distribution information of the edge information in the plurality of directions may be represented by histograms, and in step 1205, histograms of the distribution information in the plurality of directions as described above are generated.

In step 1207, function fitting is performed on the histograms of the distribution information in the plurality of directions and fitting parameters are determined. Function fitting may be performed on the histograms of the distribution information in the plurality of directions to obtain multiple sets of fitting parameters in the plurality of directions, and the multiple sets of fitting parameters may be subjected to a fusion operation (e.g., summing, mean value and variance calculations, etc.) to form the final fitting parameters. In the embodiments of the present invention, the histograms of the distribution information in the plurality of directions are fitted specifically to a Gaussian function.

In step 1209, machine learning is carried out with respect to the above fitting parameters by means of a trained second machine learning model to output a determination result as to whether motion artifacts are present.

The second machine learning model described above may include a deep learning network or a support vector machine model, and a training data set thereof may include a first data set and a second data set. Motion artifacts are present in the magnetic resonance images in the first data set (or motion artifacts are synthesized therein by means of image processing), and motion artifacts are not present in the magnetic resonance images in the second data set (or motion artifacts have already been removed by means of image processing).

As discussed herein, a support vector machine identifies a metasurface among the possible inputs, wherein the metasurface is used for binary classification of the input data. The first or second machine learning network of the embodiments of the present invention may include a plurality of integrated or cascaded support vector machine models for classifying the input data.

As discussed herein, the deep learning technology (also referred to as deep machine learning, hierarchical learning, deep structured learning, etc.) can employ an artificial neural network which performs leaning processing on input data. The deep learning method is characterized by using one or a plurality of network architectures to extract or simulate data of interest. The deep learning method may be implemented using one or a plurality of layers (such as an input layer, a normalization layer, a convolutional layer, and an output layer, where different deep learning network models may have different number or functions of layers), where the configuration and number of the layers allow the deep learning network to process complex information extraction and modeling tasks. Specific parameters (or referred to as "weight" or "bias") of the network are usually estimated through a so-called learning process (or training process). The learned or trained parameters usually result in (or output) a network corresponding to layers of different levels, so that extraction or simulation of different aspects of initial data or the output of a previous layer usually may represent the hierarchical structure or concatenation of layers. During image processing or reconstruction, this may be represented as different layers with respect to different feature levels in the data. Thus, processing may be performed layer by layer. That is, "simple" features may be extracted from input data for an earlier or higher-level layer, and then these simple features are combined into a layer exhibiting features of higher complexity. In practice, each layer (or more specifically, each "neuron" in each layer) may process input data as output data for representation using one or a plurality of linear and/or non-linear transformations (so-called activation functions). The number of the plurality of "neurons" may be constant among the plurality of layers or may vary from layer to layer.

As discussed herein, as part of initial training of a machine learning process to solve a specific problem, a training data set for a machine training model consists of a known input value and an expected (target) output value finally output from the machine learning process. In this manner, a deep learning algorithm can process the training data set (in a supervised or guided manner or an unsupervised or unguided manner) until a mathematical relationship between a known input and an expected output is identified and/or a mathematical relationship between the input and output of each layer is identified and represented. In the learning process, (part of) input data is usually used, and a network output is created for the input data. Afterwards, the created network output is compared with the expected output of the data set, and then a difference between the created and expected outputs is used to iteratively update network parameters (weight and/or bias). A stochastic gradient descent (SGD) method may usually be used to update network parameters. However, those skilled in the art should understand that other methods known in the art may also be used to update network parameters. Similarly, a separate validation data set may be used to validate a trained network, where both a known input and an expected output are known. The known input is provided to the trained network so that a network output can be obtained, and then the network output is compared with the (known) expected output to validate prior training and/or prevent excessive training.

Once this machine learning model is created or trained, the corresponding quality assessment result can be obtained by simply inputting image parameters obtained through image processing into the model. The model may be integrated with the module used to perform image processing, and in this way, magnetic resonance images may be simply fed into the integrated module, and then the corresponding quality assessment results can be obtained.

In some embodiments, the trained machine learning model described above is obtained based on training by a training module on an external carrier (e.g., a device outside the magnetic resonance imaging system). In some embodiments, the training system may include a first module configured to store a training data set, a second module configured to perform training and/or update based on a model, and a communication network configured to connect the first module and the second module. In some embodiments, the first module includes a data transmission unit and a first storage unit, where the first storage unit is configured to store a training data set, and the data transmission unit is configured to receive a relevant instruction (for example, for acquiring the training data set) and send the training data set according to the instruction. In addition, the second module includes a model update unit and a second storage unit, where the second storage unit is configured to store a training model, and the model update unit is configured to receive a relevant instruction and perform training and/or update of the network, etc. In some other embodiments, the training data set may further be stored in the second storage unit of the second module, and the training system may not include the first module. In some embodiments, the communication network may include various connection types, such as wired or wireless communication links, or fiber-optic cables.

Once data (for example, a trained network or model) are generated and/or configured, the data may be replicated and/or loaded into the magnetic resonance imaging system, which may be accomplished in different manners. For example, communications between different components may be accomplished through a directional connection or link loading model between the magnetic resonance imaging system and the computer, or may be accomplished by using an available wired and/or wireless connection and/or based on any suitable communication (and/or network) standard or protocol. Optionally, the data may be indirectly loaded into the magnetic resonance imaging system. For example, the data may be stored in a suitable machine-readable medium (for example, a flash memory card), and then the medium is used to load the data into the magnetic resonance imaging system (for example, by a user or an authorized person of the system on site); or the data may be downloaded to an electronic device (for example, a laptop computer) capable of local communication, and then the device is used on site (for example, by a user or an authorized person of the system) to upload the data to the magnetic resonance imaging system via a direct connection (for example, a USB connector).

Figure 13:
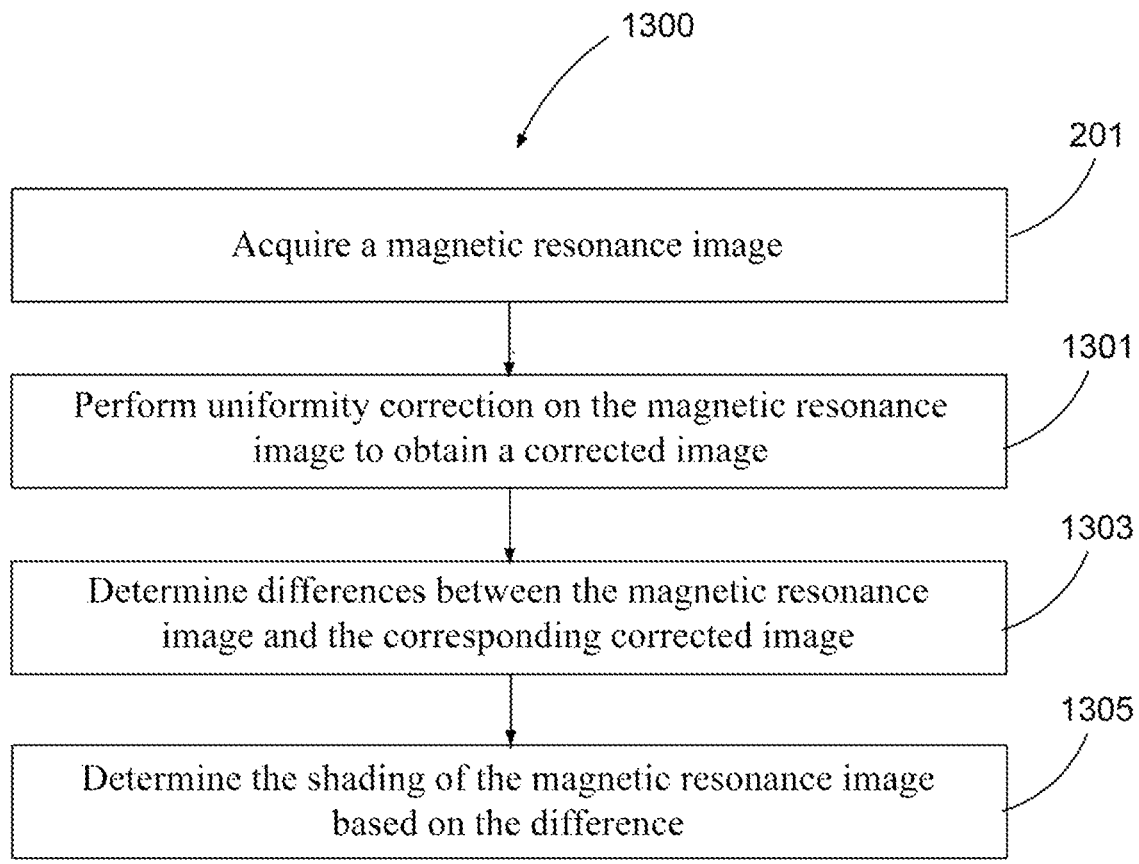
FIG. 13 illustrates a flowchart 1300 of a method for magnetic resonance image quality assessment of another embodiment of the present invention.

Referring to FIG. 13, a flowchart 1300 of a method for magnetic resonance image quality assessment of another embodiment of the present invention is illustrated, wherein it is possible to obtain an assessment result associated with shading metrics.

Wherein, step 205 of processing the magnetic resonance image may include steps 1301 and 1303. The step 209 of determining, on the basis of the image parameters, the image quality assessment result associated with the corresponding metric may include step 1305.

In step 1301, uniformity correction is carried out with respect to the magnetic resonance image to obtain a corrected image, and in step 1303, the difference between the magnetic resonance image and the corresponding corrected image is determined, and the above correction may be achieved based on the existing model for uniformity correction of the image. A person skilled in the art understands that there are various prior art uniformity correction methods that can better improve the magnetic resonance image uniformity and reduce shadows in the image. Therefore, in step 1305, the difference between the image after correction (i.e., the corrected image) and the magnetic resonance image to be assessed is used as an image parameter to further assess the image quality of the magnetic resonance image associated with the shading metrics, and an accurate assessment result may be obtained, and the image quality associated with the shading metrics described above may be expressed by a shading score.

Figure 14:
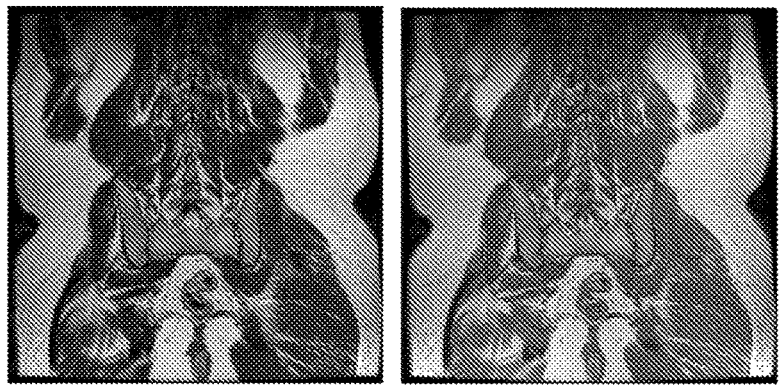
FIG. 14 illustrates quality assessment results of multiple magnetic resonance images associated with shading metrics obtained by using the method according to the embodiments of the present invention.
Figure 14:
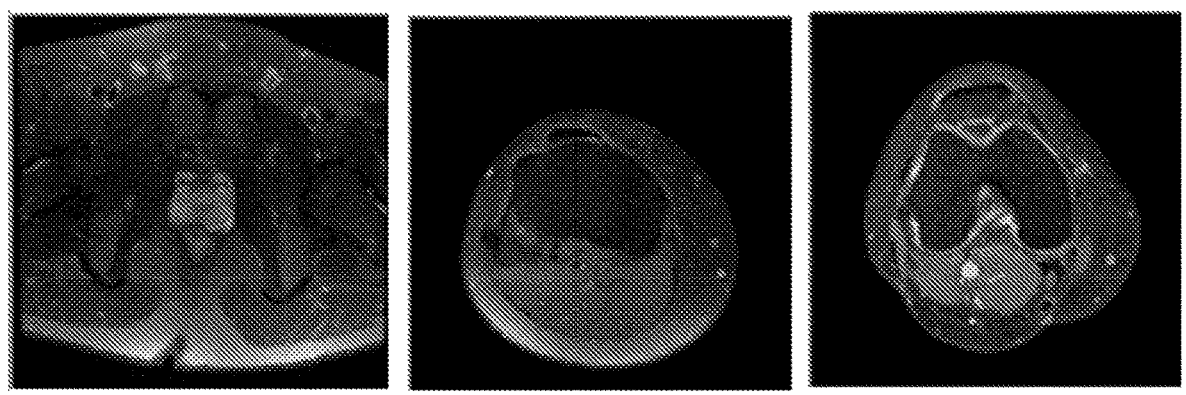

Referring to FIG. 14, quality assessment results of multiple magnetic resonance images associated with shading metrics obtained by using the method according to embodiments of the present invention are illustrated, wherein shading scores are obtained. As shown in the results, the more severe the shading in the images is, the higher the shading score is, indicating that the assessment results are accurate and thus can be used as a reliable basis for clinical assessment.

Table 3 below shows the scan parameters set when scanning the same volunteer using the same series of products before replacing the main component (replacing the original coil C with coil D) and after replacing this component.

TABLE 3

|  | Product 4 before coil replacement | Product 4 after coil replacement |
| --- | --- | --- |
| Coil | Coil C | Coil D |
| Size of the collected data | Fifth size | Fifth size |
| Size of reconstructed data | Fourth size | Fourth size |
| Number of excitations | 1.5 | 1.5 |

Table 4 below illustrates quality assessment results of magnetic resonance images associated with different metrics and acquired based on the two sets of scan parameters in Table 1.

TABLE 4

|  | Product 4 before coil replacement | Product 4 after coil replacement |
| --- | --- | --- |
| Subjective score | 4.8 | 4.3 |
| Image signal-to-noise ratio | 85 | 65 |

By comparison, it can be seen that there is a large degree of degradation in the image quality of the acquired images after replacement of the coil of the product, which indicates that the operation of replacing the coil has an impact on the product performance. Based on such a comparison, the embodiment of the present invention can also generate a corresponding analysis report or warning information for the user's reference.

Further provided in an exemplary embodiment of the present invention may be a computer-readable storage medium, including a stored computer program, wherein the method for magnetic resonance image quality assessment in any of the aforementioned embodiments is performed when the computer program is run.

Figure 15:
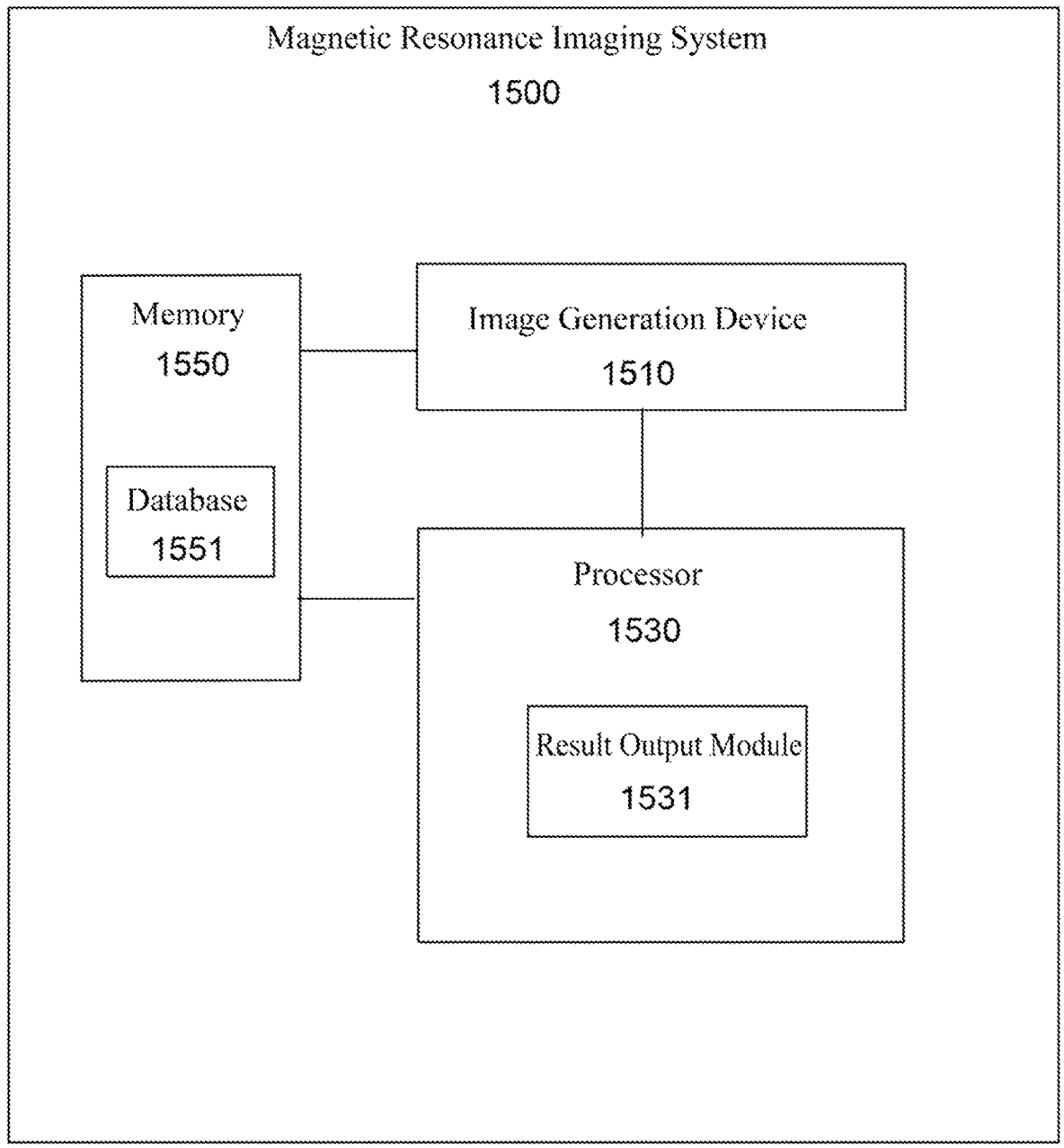
FIG. 15 illustrates an MRI system 1500 of an embodiment of the present invention.

FIG. 15 illustrates a magnetic resonance imaging (MM) system 1500 of an embodiment of the present invention, which includes an image generation device 1510 and a processor 1530. The image generation device 1510 is used to perform a magnetic resonance scan to generate a magnetic resonance image. The device 1510 may, for example, include some or all of the components/units/modules of the system 100 shown in FIG. 1, or alternatives having similar functions to those components/units/modules.

Processor 1530 is used to perform the method for magnetic resonance image quality assessment of any of the above embodiments. The processor 1530 may be provided in a computer system capable of communicating with the image generation device 1510, and may communicate with the computer system in the system 100 described above.

Referring to FIG. 15, the system 1500 further includes a memory 1550, which may be any of the memories in the system 100 or may be a separate memory that can be accessed by the image generation device 1510 and the processor 1530. The memory 1550 stores a pre-established database 1551 that includes associated information relating to, for example, a magnetic resonance image generated by the image generation device 1510, the associated information including one or more of information about the time at which the magnetic resonance image is generated by the image generation device 1510, scan parameters used when the magnetic resonance scan is performed, human anatomy information used when the magnetic resonance scan is performed, and/or information of a product that performs the magnetic resonance scan. The database 1551 further includes the image quality assessment results of the magnetic resonance images as described above.

With continued reference to FIG. 15, the above processor 1530 may include a results output module 1531 that is used to receive user-determined associated information via a user interface, select a corresponding quality assessment result of a corresponding magnetic resonance image based on the associated information, and output the selected image quality assessment result via the user interface.

The result output module 1531 is further used to receive, via the user interface, a user-determined metric for assessing image quality and to output, via the user interface, an image quality assessment result associated with the selected metric.

In the embodiment of the present invention, by performing image processing based on preset metrics to extract image parameters associated with the metrics and performing quality assessment based on the image parameters, the accuracy of the quality assessment can be improved while generating more detailed assessment results in multiple dimensions (metrics), and the reliability of the result data is high, which facilitates further analyses based on the results in order to meet a wider range of needs.

In addition to any previously indicated modifications, many other variations and replacement arrangements may be devised by those skilled in the art without departing from the substance and scope of the present description, and the appended claims are intended to encompass such modifications and arrangements. Therefore, although the information has been described above in specifics and detailed terms in connection with what is currently considered to be the most practical and preferred aspects, it will be apparent to those of ordinary skills in the art that many modifications can be made, including but not limited to the form, function, mode of operation and use, without departing from the principles and concepts set forth herein. Likewise, as used herein, in all respects, the examples and embodiments are intended to be illustrative only and should not be construed as limiting in any way.

The purpose of providing the above specific embodiments is to facilitate understanding of the content disclosed in the present invention more thoroughly and comprehensively, but the present invention is not limited to these specific embodiments. Those skilled in the art should understand that various modifications, equivalent replacements, and changes can also be made to the present invention and should be included in the scope of protection of the present invention as long as these changes do not depart from the spirit of the present invention.

The invention claimed is:

1. A method for magnetic resonance image quality assessment, the method comprising:
    acquiring a magnetic resonance image;
    processing the magnetic resonance image to extract image parameters associated with a preset metric;
    determining, on the basis of the image parameters, an image quality assessment result associated with the corresponding metric; and
    wherein the step of processing the magnetic resonance image comprises:
    generating a histogram of the intensity of the magnetic resonance image, and fitting the histogram of the intensity to a first function to generate a signal distribution;
    generating a histogram of the gradient of the magnetic resonance image, and fitting the histogram of the gradient to a second function to generate a noise distribution.

2. The method according to claim 1, further comprising: selecting and outputting an image quality assessment result of a corresponding magnetic resonance image based on information associated with the magnetic resonance image pre-stored in a database.

3. The method according to claim 2, wherein
    the information associated with the magnetic resonance image comprises one or more of time information about when the magnetic resonance image is generated, scan parameters used when the magnetic resonance scan is performed, human anatomy information used when performing the magnetic resonance scan, and/or information of a product that performs the magnetic resonance scan.

4. The method according to claim 1, further comprising: generating state indication information for a magnetic resonance imaging system based on the image quality assessment result.

5. The method according to claim 1, further comprising: selecting the preset metric and outputting an image quality assessment result associated with the selected metric.

6. The method according to claim 5, wherein the step of selecting the preset metric comprises: selecting one of at least two image quality analysis modes, wherein the at least two image quality analysis modes comprise different combinations of metrics.

7. The method according to claim 1, wherein the preset metric comprises one or more of a signal-to-noise ratio, a contrast-to-noise ratio, motion artifacts, shading, and/or a subjective score.

8. The method according to claim 7, wherein the step of processing the magnetic resonance image comprises:
    pre-processing the magnetic resonance image;
    respectively performing scaling processing on the pre-processed magnetic resonance image based on a plurality of scaling ratios to obtain a plurality of scaled images;
    respectively detecting feature points in the plurality of scaled images; and
    generating a feature distribution of the feature points.

9. The method according to claim 8, wherein
    the step of respectively detecting feature points in the plurality of scaled images comprises: performing high-frequency information enhancement on the plurality of scaled images and detecting the feature points in the scaled images after the high-frequency information enhancement; and
    the step of generating a feature distribution of the feature points comprises: determining main features describing the feature points and generating a histogram of a distribution of the main features.

10. The method according to claim 8, wherein the step of determining, on the basis of the image parameters, an image quality assessment result associated with a corresponding metric comprises:
    carrying out machine learning on the feature distribution by means of a trained first machine learning model to output a subjective score of the corresponding magnetic resonance image.

11. The method according to claim 1, wherein the first function is a Gaussian function and the second function is a Gamma function.

12. The method according to claim 1, wherein the step of determining, on the basis of the image parameters, an image quality assessment result associated with a corresponding metric comprises:
    obtaining at least one of a signal-to-noise ratio and a contrast-to-noise ratio based on the signal distribution and the noise distribution; and
    normalizing at least one of the signal-to-noise ratio and the contrast-to-noise ratio based on the scan parameters applied when performing the magnetic resonance scan.

13. The method according to claim 7, wherein the step of processing the magnetic resonance image comprises:
    extracting edge information from the magnetic resonance image;
    obtaining distribution information of the edge information in a plurality of directions;
    generating histograms of the distribution information in the plurality of directions; and performing function fitting on the histograms of the distribution information in the plurality of directions and determining fitting parameters.

14. The method according to claim 13, wherein,
a mean-subtracted contrast-normalized coefficient of the magnetic resonance image is extracted as the edge information;
multi-directional filtering is performed on the mean-subtracted contrast-normalized coefficient to obtain a multi-directionally filtered coefficient to serve as the distribution information of the edge information in the plurality of directions; and
the fitting parameters are determined by fitting a histogram of the multi-directionally filtered coefficient to a Gaussian function.

15. The method according to claim 13, wherein the step of determining, on the basis of the image parameters, an image quality assessment result associated with a corresponding metric comprises:
carrying out machine learning on the fitting parameters by means of a trained machine learning model to output a determination result as to the presence or absence of motion artifacts.

16. The method according to claim 7, wherein the step of processing the magnetic resonance image comprises:
performing uniformity correction on the magnetic resonance image to obtain a corrected image; and
determining differences between the magnetic resonance image and the corresponding corrected image; and
the step of determining, on the basis of the image parameters, an image quality assessment result associated with the metric comprises:
determining shading of the magnetic resonance image based on the differences.

17. The method according to claim 1, further comprising: generating, on the basis of the image quality assessment result, an analysis report related to the performance of a magnetic resonance imaging system.

18. A non-transitory computer-readable storage medium, comprising a stored computer program, wherein the method for magnetic resonance image quality assessment according to claim 1 is performed when the computer program is run.

19. A magnetic resonance imaging system, comprising:
an image generation device, configured to perform a magnetic resonance scan to generate a magnetic resonance image; and
a processor, configured to perform the method for magnetic resonance image quality assessment according to claim 1.

20. The system according to claim 19, further comprising a memory in which a pre-established database is stored, the database comprising information associated with a magnetic resonance image, the information associated with the magnetic resonance image comprising one or more of time information about when the magnetic resonance image is generated by the image generation device, scan parameters used when the magnetic resonance scan is performed, human anatomy information used when the magnetic resonance scan is performed, and/or information of a product that performs the magnetic resonance scan.

21. The system according to claim 19, wherein the processor comprises a result output module, configured to receive, via a user interface, user-determined information associated with the magnetic resonance image, and output, via the user interface, an image quality assessment result of a corresponding magnetic resonance image based on the information associated with the magnetic resonance image.

22. The system according to claim 19, wherein the result output module is further configured to receive, via the user interface, a user-determined metric for assessing image quality and output an image quality assessment result associated with the selected metric.

23. A method for magnetic resonance image quality assessment, the method comprising:
acquiring a magnetic resonance image;
processing the magnetic resonance image to extract image parameters associated with a preset metric;
determining, on the basis of the image parameters, an image quality assessment result associated with the corresponding metric;
wherein the step of processing the magnetic resonance image comprises:
extracting edge information from the magnetic resonance image;
obtaining distribution information of the edge information in a plurality of directions;
generating histograms of the distribution information in the plurality of directions;
performing function fitting on the histograms of the distribution information in the plurality of directions and determining fitting parameters; and
wherein,
a mean-subtracted contrast-normalized coefficient of the magnetic resonance image is extracted as the edge information;
multi-directional filtering is performed on the mean-subtracted contrast-normalized coefficient to obtain a multi-directionally filtered coefficient to serve as the distribution information of the edge information in the plurality of directions; and
the fitting parameters are determined by fitting a histogram of the multi-directionally filtered coefficient to a Gaussian function.

* * * * *